（12）United States Patent
Yoshida et al.

(10) Patent No.: US 9,099,207 B2
(45) Date of Patent: Aug. 4, 2015

(54) SYSTEM, METHOD, AND PROGRAM FOR MONITORING REACTOR CORE

(75) Inventors: Motoko Yoshida, Kawasaki (JP);
Atsuhiko Koizumi, Akiruno (JP);
Masayuki Okada, Saitama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 332 days.

(21) Appl. No.: 13/556,566

(22) Filed: Jul. 24, 2012

(65) Prior Publication Data

US 2013/0188765 A1    Jul. 25, 2013

(30) Foreign Application Priority Data

Jul. 27, 2011  (JP) ................ P2011-163954
Jun. 13, 2012  (JP) ................ P2012-133741

(51) Int. Cl.
*G21C 7/36*      (2006.01)
*G21D 3/10*      (2006.01)
*G21D 3/00*      (2006.01)

(52) U.S. Cl.
CPC .. *G21D 3/10* (2013.01); *G21C 7/36* (2013.01);
*G21D 3/001* (2013.01); *Y02E 30/40* (2013.01)

(58) Field of Classification Search
CPC ........... G21D 3/001; G21D 3/04; G21D 3/08;
G21D 3/10; G21C 7/36
USPC ................. 376/215–217, 257, 245

See application file for complete search history.

(56) References Cited

U.S. PATENT DOCUMENTS 4,297,581 A * 10/1981 Brunson et al. ............... 250/391
4,908,775 A *  3/1990 Palusamy et al. ............. 702/34
5,490,184 A *  2/1996 Heibel .......................... 376/254

* cited by examiner

*Primary Examiner* — Jack W Keith
*Assistant Examiner* — Sharon M Davis
(74) *Attorney, Agent, or Firm* — Oblon, McClelland, Maier & Neustadt, L.L.P.

(57) ABSTRACT

According to one embodiment of a reactor core monitoring system, includes: an information retention portion for retaining a regular cycle and a short cycle as calculation information of reactor core performance data; a signal processing portion for creating heat balance data based on a process signal; a data acquisition portion for acquiring, in a timing of the regular cycle, the heat balance data and reactor core performance data which was calculated in a previous timing of the regular cycle, while acquiring, in a timing of the short cycle asynchronous to the regular cycle, the heat balance data and reactor core performance data which was calculated most recently; and a data calculation portion for calculating new reactor core performance data based on the acquired reactor core performance data and the heat balance data.

3 Claims, 7 Drawing Sheets

SYSTEM, METHOD, AND PROGRAM FOR MONITORING REACTOR CORE

CROSS-REFERENCE TO RELATED APPLICATIONS

This application is based upon and claims the benefit of priority from Japanese Patient application No. 2011-163954, filed on Jul. 27, 2011 and Japanese Patient application No. 2012-133741, filed on Jun. 13, 2012, the entire contents of each of which are incorporated herein by reference.

FIELD

The present invention relates to a reactor core monitoring technology for nuclear power plants.

BACKGROUND

A reactor core monitoring system in the nuclear power plants is provided with various functions for calculating reactor core performance data, such as power distribution, so as to monitor the soundness of the reactor core. Among the reactor core performance data calculated in a 1-hour cycle or on demand by an operator, thermal limits, power distribution and burnup are targets of monitoring in one example.

The thermal limit herein refers to an instantaneous value which indicates that fuel in the reactor core has no excessive power increase and that cooling by cooling water is effective. The burnup refers to an integrated value obtained by multiplying thermal power of the reactor core by time. The burnup indicates how much nuclear fuel is consumed.

For laborsaving in the plant operation, various monitoring activities are performed to automate control instruments such as control rods. For example, there is known a thermal limit monitoring device for ABWRs, which calculates thermal limits based on process amounts in a short cycle of 200 msec so as to control automatic operation of the control rods (see Japanese Patent laid-Open No. 06-148376).

The calculation results from the thermal limit monitoring device are known to be too conservative. Accordingly, in order to prevent unnecessary interception of control rod operation, the calculation results are corrected by periodically performing calculation with use of reactor core performance data from the reactor core monitoring system as initial values so that the change of state of the plant can be recognized with precision. For this correction, the correction cycle needs to be 5 minutes or shorter. It is required, therefore, to shorten the cycle of calculating the reactor core performance data, which was conventionally 1 hour.

However, if only the calculation cycle is shortened without changing a calculation algorithm for the reactor core performance data in the conventional reactor core monitoring system, an increment of the burnup that is an integrated value of reactor core thermal power, which is calculated based on an integrated value between a present calculation value and a last calculation value, decreases. In this regard, when the increment of the burnup is distributed as three-dimensional data having about 20,000 data points for another calculation such as an isotope weight calculation, the increment value becomes smaller and thereby cancellation of significant digits may occur. As a result, accuracy in calculation of the isotope weight, which is calculated by distributing the burnup as three-dimensional data, may be deteriorated.

DETAILED DESCRIPTION

First Embodiment

The embodiments of the present invention will be described hereinbelow with reference to the accompanying drawings.

Figure 1:
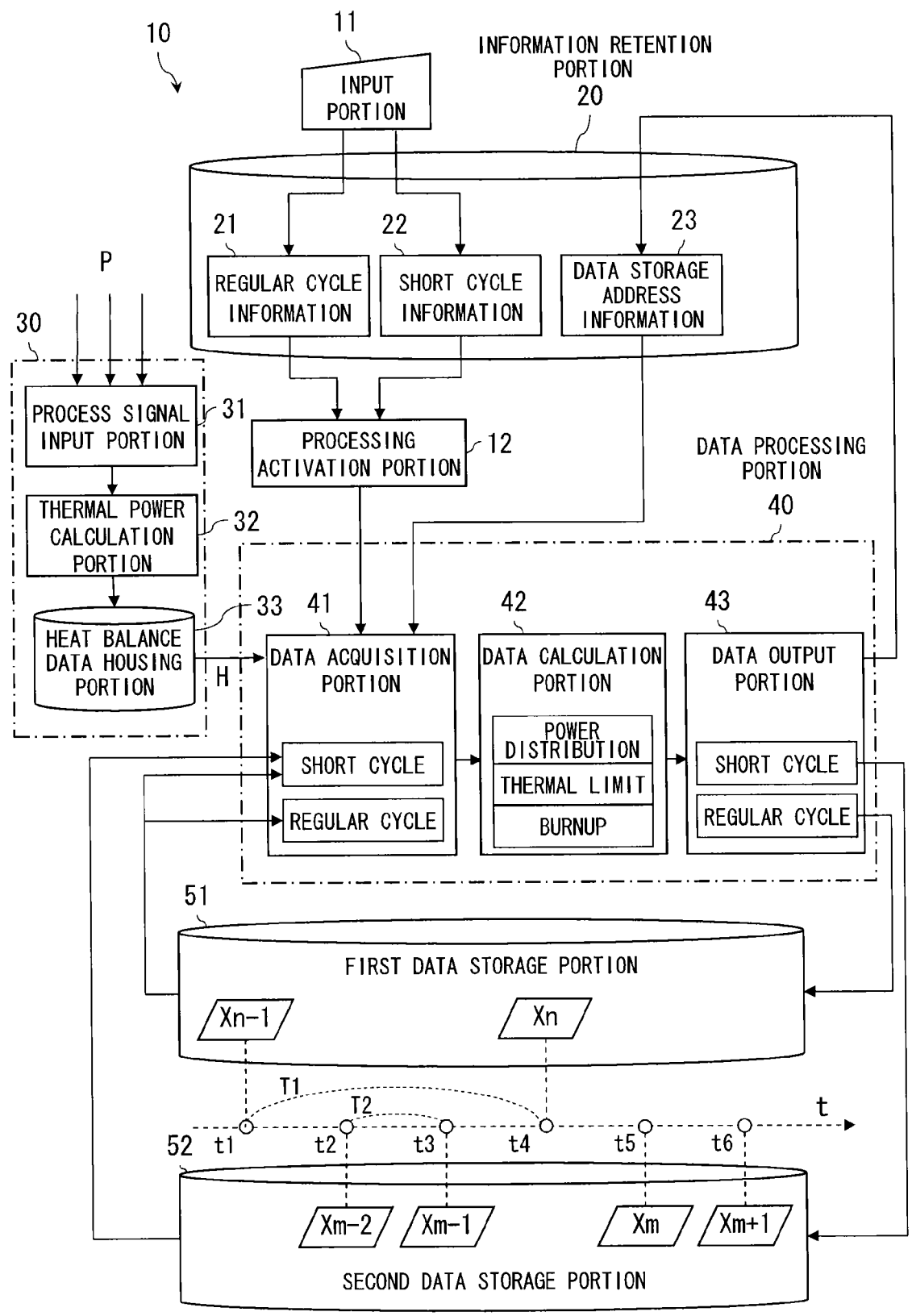
FIG. 1 is a block diagram showing a first embodiment of a reactor core monitoring system according to the present invention.

As shown in FIG. 1, a reactor core monitoring system 10 of a first embodiment includes: an information retention portion 20 for retaining a regular cycle T1 and a short cycle T2 as calculation information of reactor core performance data X; a signal processing portion 30 for creating heat balance data H based on a process signal P; a data acquisition portion 41 for acquiring, in a timing of the regular cycle, the heat balance data H and reactor core performance data X which was calculated in a previous timing of the regular cycle T1, while acquiring, in a timing of the short cycle T2 asynchronous to the regular cycle T1, the heat balance data H and reactor core performance data X which was calculated most recently; and a data calculation portion 42 for calculating new reactor core performance data X based on the acquired reactor core performance data X and the heat balance data H.

The information retention portion 20 retains regular cycle information 21, short cycle information 22, and data storage address information 23.

As the regular cycle information 21, information on every activation time in the regular cycle T1 from a set initial activation time is retained in the information retention portion 20, the regular cycle T1 being 1 hour for example.

As the short cycle information 22, information on every activation time in the short cycle T2 shorter than the regular cycle T1 is retained in the information retention portion 20, the short cycle T2 being 10 minutes for example.

The regular cycle T1 and the initial activation time thereof in the regular cycle information 21, as well as the short cycle T2 and the initial activation time thereof in the short cycle information 22 can arbitrarily be set by operating an input portion 11. Moreover, the short cycle information 22 can be changed from the input portion 11, so that the activation of the short cycle T2 can arbitrarily be started and stopped and that the time intervals of the short cycle T2 can be switched.

A processing activation portion 12 is to activate a data processing portion 40 at a time specified by the regular cycle information 21 and the short cycle information 22 retained in the information retention portion 20. As described later, the processing detail of the data processing portion 40 is different depending on whether the data processing portion 40 is activated based on the regular cycle information 21 or activated based on the short cycle information 22.

The data storage address information 23 is the information on the storage address of the reactor core performance data X calculated in the data processing portion 40. Calculation of the reactor core performance data X in the data processing portion 40 needs the heat balance data X in the present timing and the reactor core performance data X calculated in the previous timing. Accordingly, the storage address of the reactor core performance data X calculated in the past is registered on the information retention portion 20. The data processing portion 40 acquires the heat balance data H in the timing when an activation command has been received from the processing activation portion 12. The data processing portion 40 further refers to the data storage address information 23 and acquires the reactor core performance data X of the previous timing from data storage portions 51, 52.

As the storage address information of the reactor core performance data X, the time and the file name of the reactor core performance data X may be used in place of the storage address.

The signal processing portion 30 is composed of an input portion 31 for inputting process signals P, such as reactor pressure, temperature, flow rate, control rod position, APRM, and LPRM signals, a thermal power calculation portion 32 which calculates heat balance data H based on the inputted process signals P, and a housing portion 33 for housing the calculated heat balance data H. The process signal input portion 31 receives an input of the process signal P at about 5-second intervals, while the thermal power calculation portion 32 calculates the heat balance data H at about 15-second intervals.

The data processing portion 40 is composed of the data acquisition portion 41, the data calculation portion 42, and a data output portion 43. The data processing portion 40 performs the following processes in time series of t1 to t6.

In a timing t4 of the regular cycle T1, the heat balance data H and reactor core performance data Xn−1 which was calculated in the previous timing t1 of the regular cycle T1 are acquired in the data acquisition portion 41, and new reactor core performance data Xn is calculated in the data calculation portion 42 and is stored in the first data storage portion 51 from the data output portion 43.

Examples of the reactor core performance data X mainly include power distribution, thermal limits, and burnup, which are targets of monitoring.

In a timing t3 of the short cycle T2 which is asynchronous to the regular cycle T1, the heat balance data H and reactor core performance data Xm−2, which was calculated most recently, are acquired in the data acquisition portion 41, and new reactor core performance data Xm−1 is calculated in the data calculation portion 42 and is stored in the second data storage portion 52 from the data output portion 43.

In a timing t4 of the short cycle T2 which is synchronized with the regular cycle T1, the processing of the regular cycle T1 is given priority as described before.

In a timing t5 of the short cycle T2 which is asynchronous to the regular cycle T1, the heat balance data H and reactor core performance data Xn, which was calculated most recently, are acquired in the data acquisition portion 41, and new reactor core performance data Xm is calculated in the data calculation portion 42 and is stored in the second data storage portion 52 from the data output portion 43.

In the embodiment, the regular cycle T1 is in the relation of a multiple of the short cycle T2. The timing of the short cycle T2 is therefore in synchronization with the regular cycle T1 every three cycles. However, the regular cycle T1 does not need to be in the relation with the short cycle T2, and the regular cycle T1 does not need to be in synchronization with the short cycle T2.

Thus, the reactor core performance data (Xn−1, Xn) calculated in the timing (t1, t4) of the regular cycle T1 are stored in the first data storage portion 51. The reactor core performance data (Xm−2, Xm−1, Xm, Xm+1) calculated in the timing (t2, t3, t5, t6) of the short cycle T2 asynchronous to the regular cycle T1 are stored in the second data storage portion 52.

As a result, the reactor core performance data Xm are stored in the timing of the short cycle T2. However, since the reactor core performance data Xn calculated in the regular cycle T1 are present therein in a distributed manner, amplification of the error by short cycle T2 calculation is prevented.

For the articles such as fuel thermal limits which require monitoring in a short cycle, the reactor core performance data of the short cycle stored in the first and second data storage portions 51, 52 are used.

As a result, the thermal limits can be calculated and corrected in a short cycle of, for example, about 5 minutes with use of the reactor core performance data of the reactor core monitoring system as initial values.

For the articles such as the burnup which gains calculation error in the short cycle monitoring, the reactor core performance data of the regular cycle stored in the first data storage portion 51 are used.

As a result, a sufficient increment is secured for an integrated value between a present calculation value and a previous calculation value. This makes it possible to calculate the burnup which is an integrated value of reactor core thermal power with sufficient precision.

Furthermore, when the increment of the burnup is distributed as three-dimensional data having about 20,000 data points for another calculation, that is, an isotope weight calculation for example, the presence of the sufficient increment of the burnup suppresses occurrence of the cancellation of significant digits. As a result, accuracy in calculation of the isotope weight is enhanced.

Figure 2:
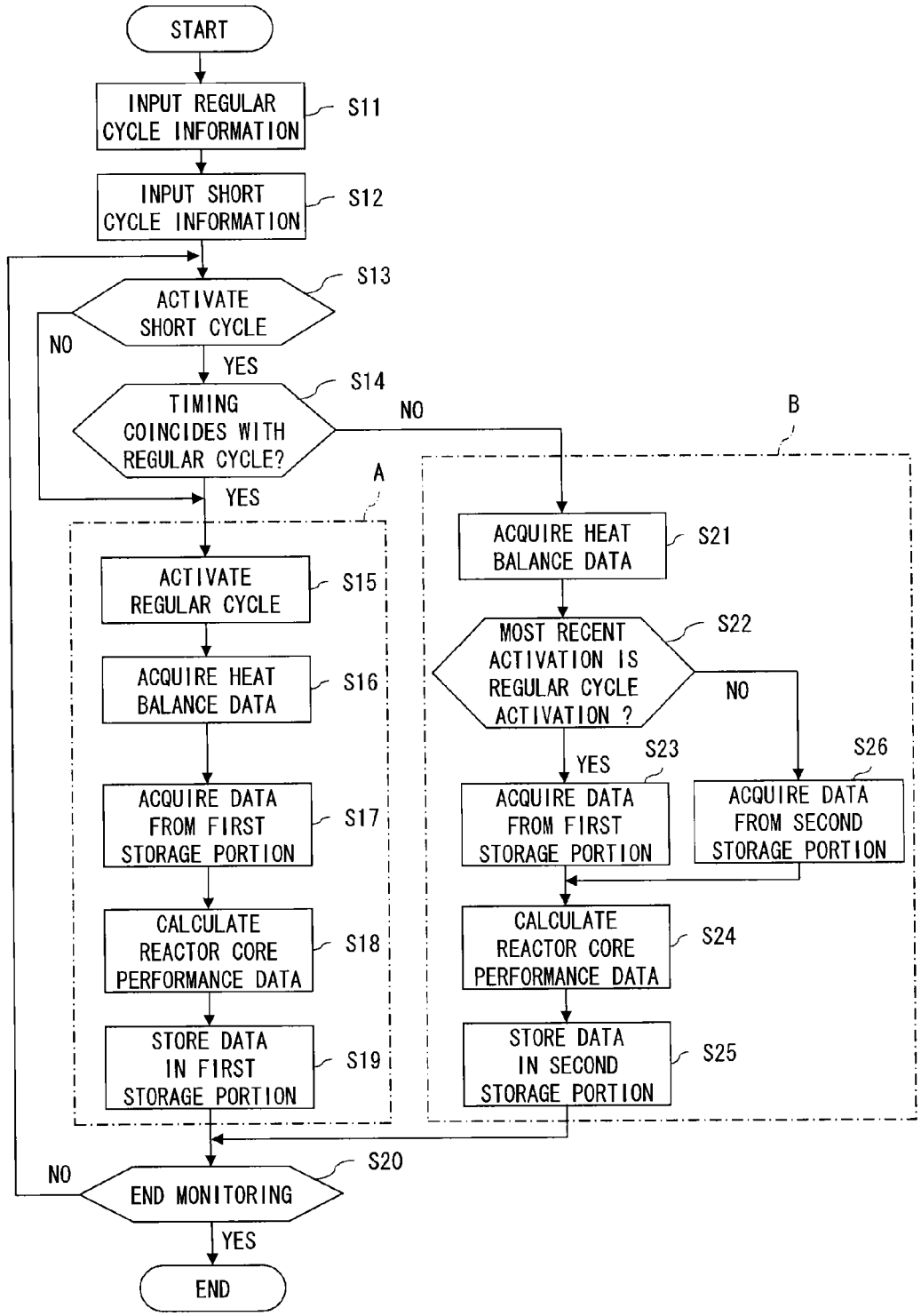
FIG. 2 is a flowchart showing operation of the reactor core monitoring system according to the first embodiment.

A description is now given of the operation of the reactor core monitoring system according to the first embodiment with reference to the flowchart of FIG. 2 (see FIG. 1 as needed).

First, the regular cycle information 21 and the short cycle information 22 are inputted from the input portion 11 to the information retention portion 20 (S11, S12). When it is not necessary to monitor the reactor core performance data X in the short cycle T2 (S13 No), only a routine A based on the regular cycle information 21 is activated.

In the routine A, the data acquisition portion 41 is activated in a timing t4 of the regular cycle (S15). The data acquisition portion 41 acquires heat balance data H from the process signal processing portion 30 (S16), and acquires reactor core performance data Xn−1 from the first data storage portion 51 (S17). In the data calculation portion 42, reactor core performance data Xn is newly calculated (S18) and is stored in the first data storage portion 51 (S19).

When the necessity of monitoring the reactor core performance data X in the short cycle T2 arises (S13 Yes), a routine B based on the short cycle information 22 is activated together with the routine A based on the regular cycle information 21.

First, in the timing t4 when the regular cycle T1 coincides with the short cycle T2 (S14 Yes), the routine A is activated as described before.

In a timing t5 when the regular cycle T1 does not coincide with the short cycle T2 (S14 No), the activated data acquisition portion 41 acquires the heat balance data H from the process signal processing portion 30 (S21). In the timing t5, since the most recent activation is the regular cycle activation in the timing t4 (S22 Yes), the reactor core performance data Xn is acquired from the first data storage portion 51 (S23). In the data calculation portion 42, reactor core performance data Xm is newly calculated (S24) and is stored in the second data storage portion 52 (S25).

In a timing t6, since the most recent activation is the short cycle activation in the timing t5 (S22 No), the reactor core performance data Xm is acquired from the second data storage portion 52 (S26). In the data calculation portion 42, reactor core performance data Xm+1 is newly calculated (S24) and is stored in the second data storage portion 52 (S25).

The aforementioned routine is repeated (S20 No, Yes) until monitoring of the reactor core performance data X is completed.

Thus, in the reactor core monitoring system 10 according to the first embodiment, the reactor core performance data of the previous timing for use in calculation is selectively used depending on in the regular cycle and in the short cycle. This makes it possible to decrease the error and enhance the accuracy in the case of calculating the burnup and the like while monitoring the reactor core performance data based on short-term plant fluctuations.

Second Embodiment

Figure 3:
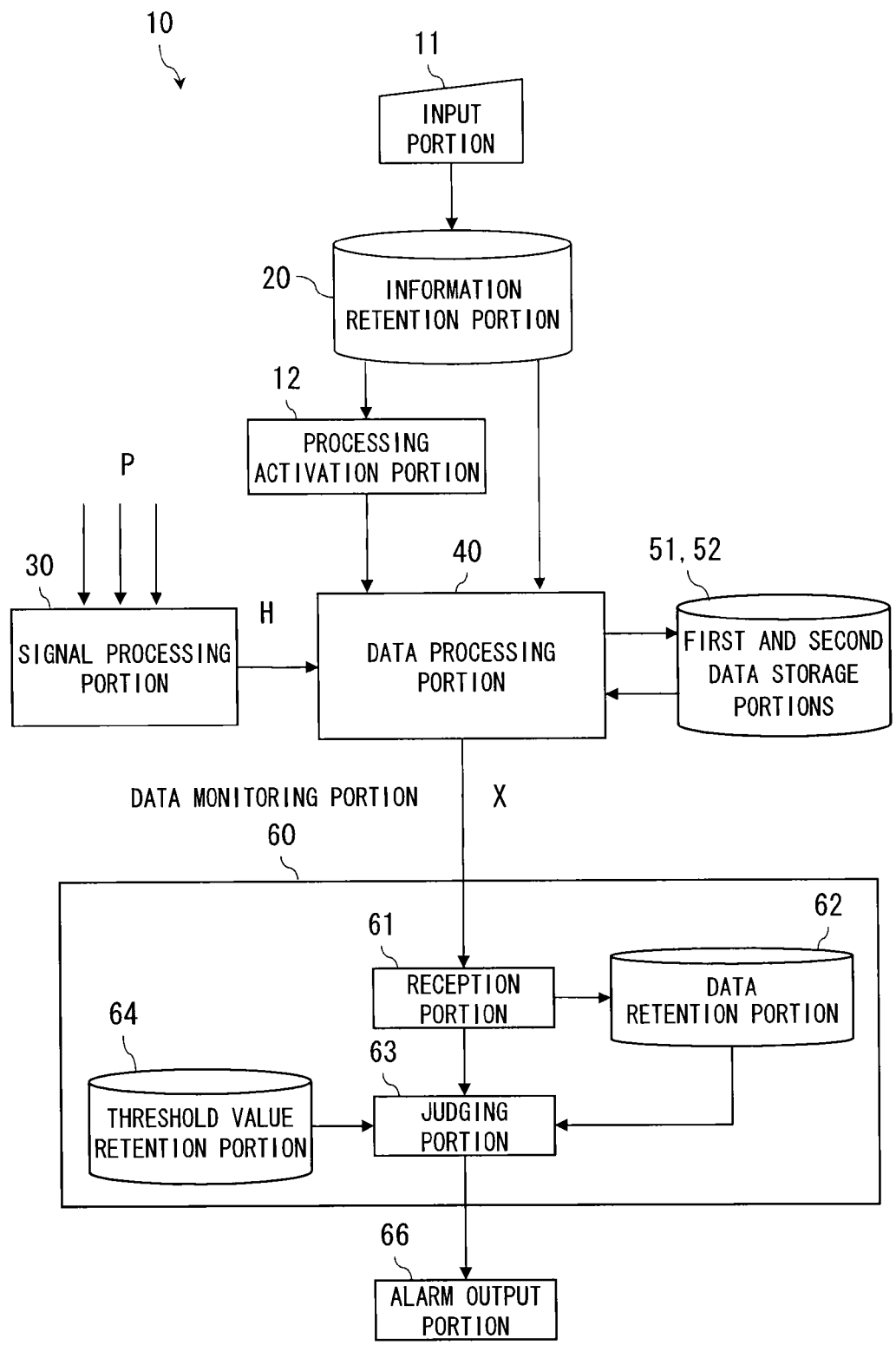
FIG. 3 is a block diagram showing a second embodiment of the reactor core monitoring system according to the present invention.

A description is given of a reactor core monitoring system 10 of a second embodiment with reference to FIG. 3. In FIG. 3, component parts identical to those in FIG. 1 are designated by identical reference numerals and redundant description thereof will be omitted.

The reactor core monitoring system 10 of the second embodiment is provided with a data monitoring portion 60 for judging new reactor core performance data X calculated in the data processing portion 40 with reference to a threshold value.

The data monitoring portion 60 is composed of a reception portion 61 for receiving the reactor core performance data X outputted from the data processing portion 40, a data retention portion 62 for temporarily retaining the received reactor core performance data X, and a judging portion 63 for making pass/failure judgment based on latest reactor core performance data X received in the reception portion 61, past reactor core performance data X retained in the data retention portion 62, and the threshold value in the threshold value retention portion 64.

When a failure judgment is made in the judging portion 63, the judgment is reported from an alarm output portion 66.

Figure 4:
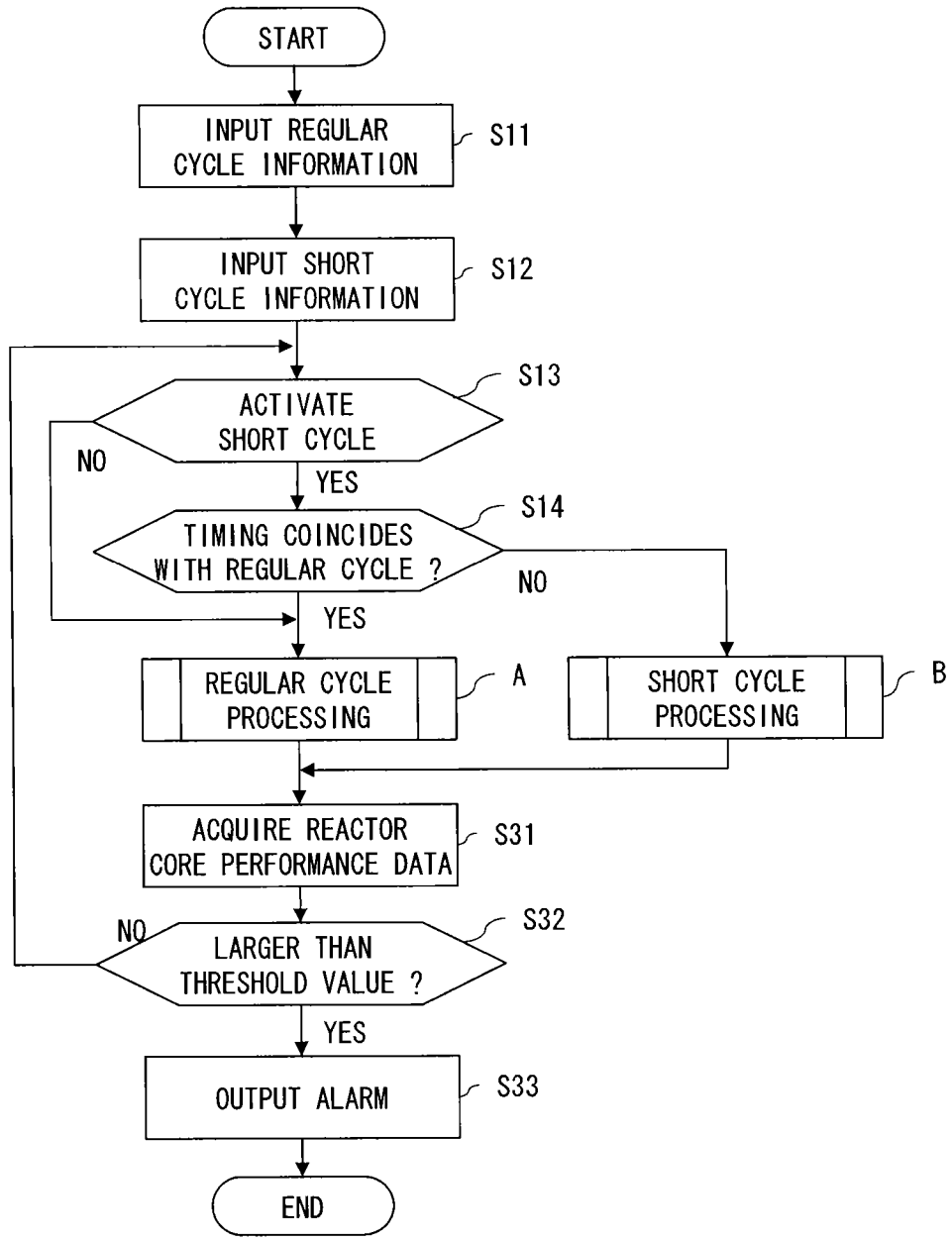
FIG. 4 is a flowchart showing operation of the reactor core monitoring system according to the second embodiment.

A description is given of the operation of the reactor core monitoring system according to the second embodiment with reference to the flowchart of FIG. 4 (see FIG. 3 as needed). Since the flow of S11 to S14 and the routines A and B in the flowchart of FIG. 4 are similar to the corresponding flow and routines in the flowchart of FIG. 2, redundant descriptions will be omitted.

The data monitoring portion 60 acquires reactor core performance data X from the data processing portion 40 in the reception portion 61 (S31). The data monitoring portion 60 then obtains the amount of change between the acquired latest reactor core performance data and the past reactor core performance data retained in the data retention portion 62. If the obtained amount of change is larger than the threshold value (S32 Yes), an alarm is outputted (S33). If the amount of change is not larger than the threshold value, the alarm is not outputted (S32 No).

Thus, it becomes possible to know whether or not the reactor core performance data has a rapid change by the alarm outputted at the moment when the amount of change has exceeded the value preset as a threshold value. Accordingly, the operator does not need to monitor the output result on the constant basis, so that reduction in the load of the operator and prompt detection of any abnormalities in the plant can be achieved.

Third Embodiment

Figure 5:
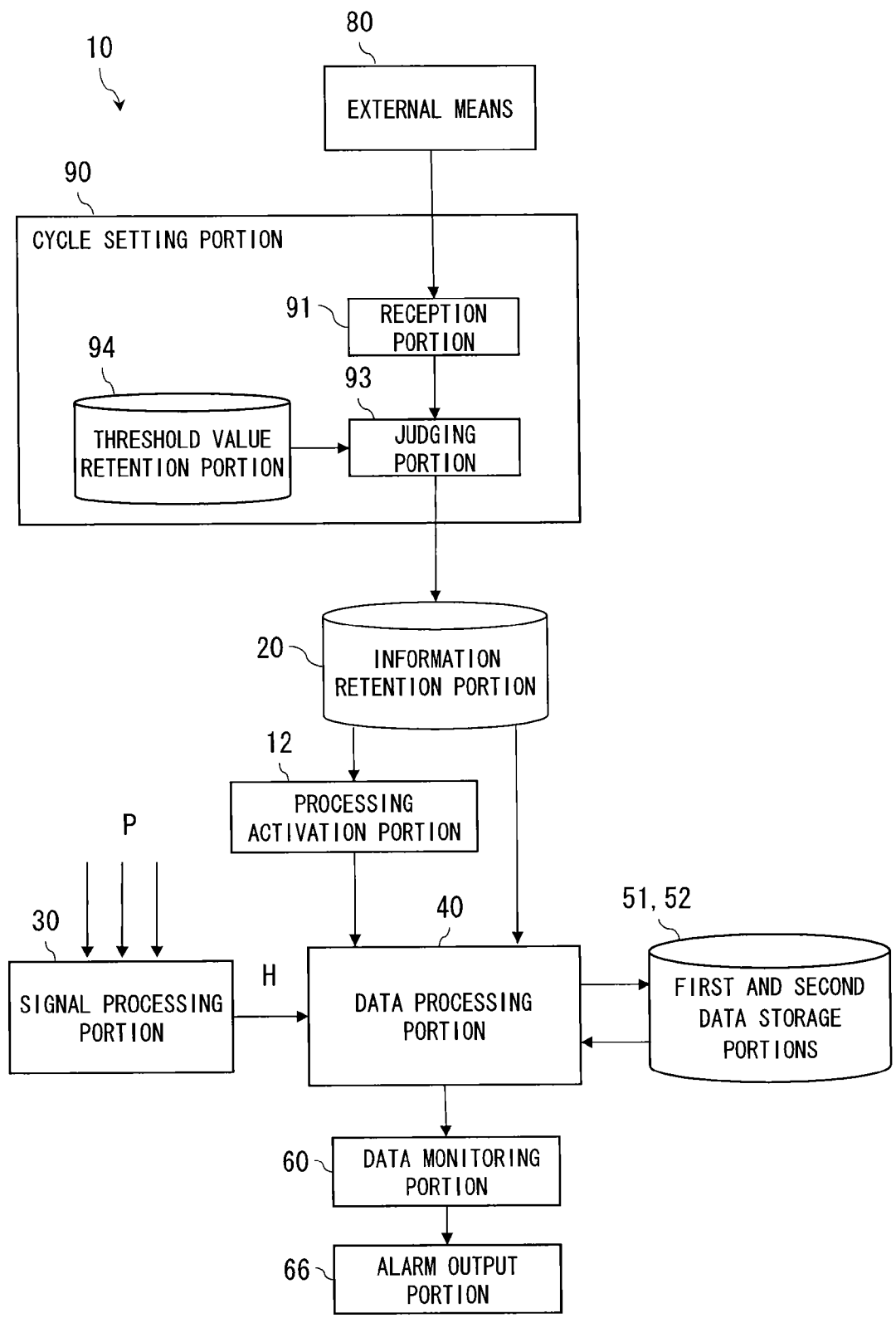
FIG. 5 is a block diagram showing a third embodiment of the reactor core monitoring system according to the present invention.

A description is given of a reactor core monitoring system 10 of a third embodiment with reference to FIG. 5. In FIG. 5, component parts identical to those in FIG. 1 are designated by identical reference numerals and redundant description thereof will be omitted.

The reactor core monitoring system 10 of the third embodiment is provided with a cycle setting portion 90 which starts/stops activation of the short cycle based on external information provided from an external means 80.

The external means 80 is more specifically a thermal limit monitoring device. The thermal limit monitoring device uses the reactor core performance data (thermal limit) calculated in the reactor core monitoring system 10 as initial values to calculate a thermal limit in a short cycle by a correction operation which uses only the amount of change in the process signal P. Since the thermal limit by this correction operation is low in precision, a calculation result is outputted so that conservative assessment is provided.

When the thermal limit obtained by this correction operation becomes larger than the threshold value, automatic operation of the control rod stops and is switched to manual operation. Since the correction operation by the thermal limit monitoring device is low in precision as described before, there were cases where automatic operation of the control rod stopped even when the actual thermal limit was not larger the threshold value.

Accordingly, the calculation cycle of the reactor core performance data (thermal limit) in the reactor core monitoring system 10 is shortened in order to suppress the error amount accumulated through the correction operation by the thermal limit monitoring device.

The cycle setting portion 90 is composed of a reception portion 91 for receiving the thermal limit provided by the correction operation from the thermal limit monitoring device (external means 80) and a judging portion 93 for judging whether the thermal limit provided by the correction operation has exceeded the threshold value in a threshold value retention portion 94.

The result of the judgment whether the thermal limit has exceeded the threshold value or not is reflected upon the short cycle information 22 (FIG. 1) in the information retention portion 20. In short, when the thermal limit has not exceeded the threshold value, activation of the short cycle can be stopped, and the short cycle can be activated at the moment when the thermal limit has exceeded the threshold value. Moreover, a plurality of threshold values may be provided and a plurality of time intervals of the short cycle may be switched so as to optimize reactor core monitoring.

Moreover, the reactor core monitoring may be optimized not based on the external information provided by the external means 80 but by inputting the reactor core performance data, which is outputted from the data processing portion 40, into the cycle setting portion 90 and switching a plurality of time intervals of the short cycle.

Although the thermal limit monitoring device which outputs the thermal limit provided by correction operation was shown as the external means 80, the present invention is not limited to the structure disclosed. The plant state may be judged based on plant operation modes and information provided from the means which outputs the heat balance data H. When the results of the judgment indicate that the plant operation mode is not automatic and that the furnace power is low, activation of the short cycle can be stopped and thereby the load of the computing machine can be reduced.

Figure 7:
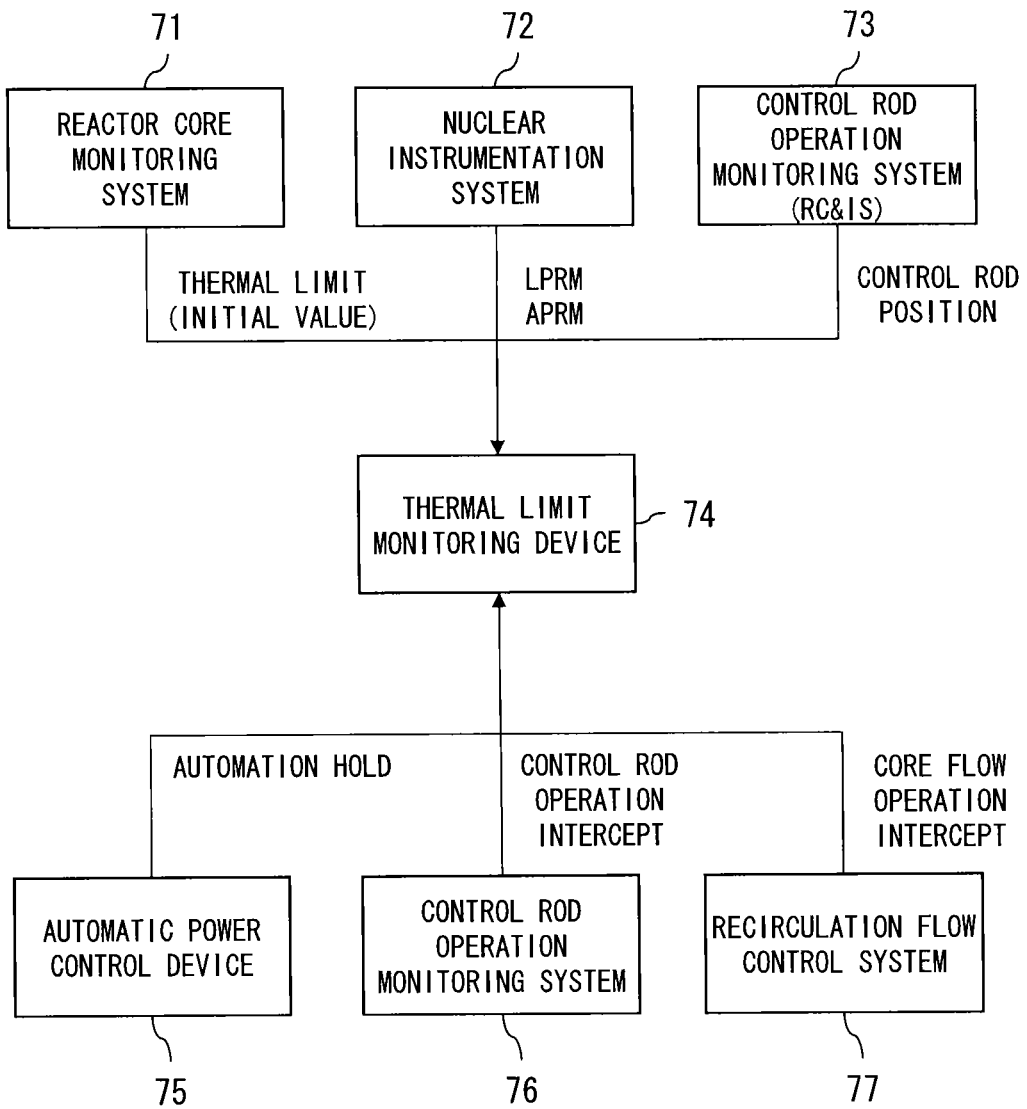
FIG. 7 is a block diagram showing the structure of an automation system for control rod operation in the reactor core monitoring system according to the third embodiment.

Although the cycle setting portion 90 was shown to be placed inside the reactor core monitoring system, the placement position of the cycle setting portion 90 is not limited thereto. FIG. 7 shows an automation system for control rod operation.

In the automation system for control rod operation, a thermal limit monitoring device 74 receives process amounts such as thermal limits (initial values), LPRM values, APRM values, and control rod positions from a reactor core monitoring system 71, a nuclear instrumentation system 72, and a control rod operation monitoring system 73.

The thermal limit monitoring device 74 calculates thermal limits and thermal condition values based on the process amounts.

According to the calculation results, the thermal limit monitoring device 74 further outputs control signals such as an automation hold signal, a control rod operation intercept signal, and a core flow operation intercept signal to an automatic power control device 75, a control rod operation monitoring system 76 and a recirculation flow control system 77.

In such an automation system for control rod operation, the cycle setting portion 90 is placed inside the thermal limit monitoring device 74. The cycle setting portion 90 compares the thermal limit, calculated by the thermal limit monitoring device 74 itself, with the aforementioned threshold value.

The reactor core monitoring system 71 activates and stops the short cycle and switches the time intervals of the short cycle based on the judgment results of the cycle setting portion 90 inside the thermal limit monitoring device 74. As a consequence, the effect equivalent to that in the system where the cycle setting portion 90 is placed in the reactor core monitoring system 71 can be achieved.

Figure 6:
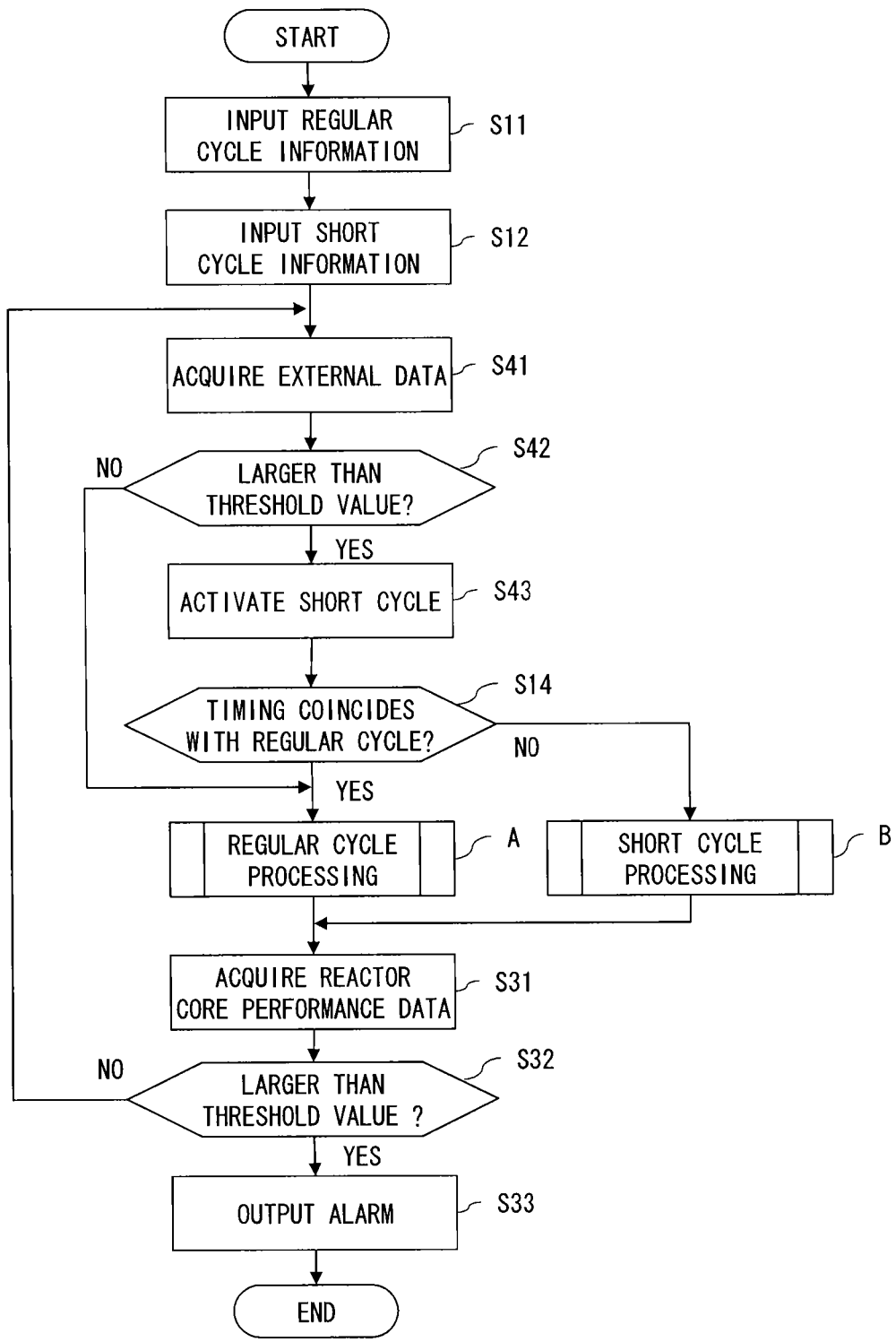
FIG. 6 is a flowchart showing operation of the reactor core monitoring system according to the third embodiment.

A description is given of the operation of the reactor core monitoring system according to the third embodiment with reference to the flowchart of FIG. 6 (see FIG. 5 as needed). Since the flow of S11, S12, S14, S31 to S33 and the routines A and B in the flowchart of FIG. 6 are similar to the corresponding flow and routines in the flowchart of FIG. 4, redundant descriptions will be omitted.

The cycle setting portion 90 acquires information from the external means 80 in the reception portion 91 (S41). If the acquired external information is larger than the threshold value (S42 Yes), the short cycle is activated and subsequent processing progresses (S43, routines A and B). After that, if the external information becomes less than the threshold value, activation of the short cycle is stopped (S42 No, routine A).

Thus, the activation of the short cycle in the reactor core monitoring system 10 can be turned on and off based on the information sent from the external means 80. In the case where the thermal limit monitoring device is adopted as the external means 80, the reactor core monitoring system 10 is switched to short cycle activation, so that the error amount of the thermal limit accumulated by the correction operation can be decreased. As a consequence, the probability of unnecessary stop of the automatic operation of the control rod can be decreased, and thereby the load of the operator can be reduced.

Moreover, since the short cycle is automatically activated when the necessity of intensive monitoring arises, it becomes unnecessary to apply an unnecessary load to the computing machine.

As described, at least one embodiment of this present invention to provide a reactor core monitoring technology which calculates reactor core performance data in a short cycle with high precision.

The present invention is not limited to the embodiments disclosed. The present invention can appropriately be deformed and implemented within the scope of common technical conceptions.

The reactor core monitoring system can implement respective means as respective function programs by computer. The reactor core monitoring system can also be operated by a reactor core monitoring program formed by combining the respective function programs.

What is claimed is:

1. A reactor core monitoring system, comprising:
   an information retention portion configured to retain a regular cycle time interval and a short cycle time interval used for calculating reactor core performance data, the time interval of the short cycle being shorter than the regular cycle thereof;
   a first data storage portion configured to store the reactor core performance data calculated in the timing of the regular cycle, the reactor core performance data including at least one information of power distribution, thermal limits, and amount of fuel consumed;
   a second data storage portion configured to store the reactor core performance data calculated in the timing of the short cycle asynchronous to the regular cycle;
   a signal processing portion configured to create heat balance data based on a process signal in a cycle which is shorter than the short cycle, the process signal including at least one information of reactor pressure, temperature, flow rate, control rod position, average power range modeling signals, and local power range modeling signals;
   a data acquisition portion configured to acquire, in a timing of the regular cycle, latest heat balance data from the signal processing portion and reactor core performance data which was calculated in a previous timing of the regular cycle from the first data storage portion, while also being configured to acquire, in a timing of the short cycle asynchronous to the regular cycle, latest heat balance data from the signal processing portion and reactor core performance data from either the first data storage portion or the second data storage portion which was calculated most recently regardless of whether calculated in the regular cycle or the short cycle; and
   a data calculation portion configured to calculate new reactor core performance data indicating an updated amount of fuel consumed based on the acquired reactor core performance data and the heat balance data, the new reactor core performance data being stored in the first data storage portion or the second data storage portion.

2. The reactor core monitoring system according to claim 1, further comprising an input portion configured to receive input information corresponding to the regular cycle time interval, the short cycle time interval, and an activation time of the short cycle, wherein activation of the short cycle time interval is started/stopped arbitrarily.

3. The reactor core monitoring system according to claim 1, wherein the information retention portion is also configured to retain storage address information on the reactor core performance data calculated in the data calculation portion.

* * * * *